(12) United States Patent
Ma

(10) Patent No.: US 9,141,282 B2
(45) Date of Patent: Sep. 22, 2015

(54) APPARATUS AND METHOD FOR CHANGING INPUT MODE IN PORTABLE TERMINAL

(75) Inventor: Dong-Chul Ma, Ohsan-si (KR)

(73) Assignee: Samsung Electronics Co., Ltd (KR)

(*) Notice: Subject to any disclaimer, the term of this patent is extended or adjusted under 35 U.S.C. 154(b) by 1909 days.

(21) Appl. No.: 11/840,906

(22) Filed: Aug. 17, 2007

(65) Prior Publication Data

US 2008/0042990 A1 Feb. 21, 2008

(30) Foreign Application Priority Data

Aug. 18, 2006 (KR) .................. 10-2006-0077970

(51) Int. Cl.
G06F 3/041 (2006.01)
G06F 3/0488 (2013.01)

(52) U.S. Cl.
CPC .................. G06F 3/04886 (2013.01)

(58) Field of Classification Search
USPC ....................................... 345/173
See application file for complete search history.

(56) References Cited

U.S. PATENT DOCUMENTS

| 5,347,295 | A * | 9/1994 | Agulnick et al. | 345/156 |
|---|---|---|---|---|
| 6,624,832 | B1 * | 9/2003 | Thomas | 715/863 |
| 7,003,308 | B1 * | 2/2006 | Fuoss et al. | 455/466 |
| 2002/0007382 | A1 * | 1/2002 | Nojima et al. | 707/532 |
| 2003/0006974 | A1 * | 1/2003 | Clough et al. | 345/179 |
| 2004/0001051 | A1 * | 1/2004 | Tomizawa et al. | 345/173 |
| 2004/0059569 | A1 * | 3/2004 | Sugano | 704/205 |
| 2006/0119582 | A1 * | 6/2006 | Ng et al. | 345/168 |
| 2006/0142997 | A1 * | 6/2006 | Jakobsen et al. | 704/10 |
| 2006/0209014 | A1 * | 9/2006 | Duncan et al. | 345/156 |
| 2007/0115265 | A1 * | 5/2007 | Rainisto | 345/173 |
| 2007/0205987 | A1 * | 9/2007 | Fux et al. | 345/169 |
| 2007/0257896 | A1 * | 11/2007 | Huh | 345/173 |

FOREIGN PATENT DOCUMENTS

| JP | 5197494 | 8/1993 |
|---|---|---|
| JP | 6161661 | 6/1994 |
| JP | 9219756 | 8/1997 |
| JP | 9258897 | 10/1997 |
| JP | 10177458 | 6/1998 |
| JP | 2000173394 | 6/2000 |
| KR | 1020010096061 A | 11/2001 |
| KR | 1020020030843 A | 4/2002 |
| KR | 1020050038441 A | 4/2005 |

* cited by examiner

Primary Examiner — Kwang-Su Yang
(74) Attorney, Agent, or Firm — The Farrell Law Firm, P.C.

(57) ABSTRACT

Provided are an apparatus and method for changing an input mode of a portable terminal according to the current state of the portable terminal during a character input operation using an input tool such as a stylus pen. The apparatus includes a touch sensor for detecting an input and a controller for controlling the touch sensor to receive the input from the touch sensor and changing the input mode if the input is a character input.

12 Claims, 4 Drawing Sheets

APPARATUS AND METHOD FOR CHANGING INPUT MODE IN PORTABLE TERMINAL

PRIORITY

This application claims priority under 35 U.S.C. §119 to an application filed in the Korean Intellectual Property Office on Aug. 18, 2006 and assigned Serial No. 2006-77970, the contents of which are incorporated herein by reference.

BACKGROUND OF THE INVENTION

1. Field of the Invention

The present invention relates generally to a portable terminal having a touch screen, and in particular, to an apparatus and method for changing an input mode of a portable terminal according to the current state of the portable terminal during a character input operation using an input tool such as a stylus pen.

2. Description of the Related Art

The use of portable terminals is increasing rapidly, as they are becoming more compact, small-sized and lightweight. Accordingly, service providers (terminal manufacturers) are developing portable terminals with more convenient functions for the purpose of attracting potential users. For example, touch screen type portable terminals capable of data input using a user's finger or a stylus pen have been developed and texts/lines can be easily and simply written/drawn in the portable terminals using the stylus pen.

The above-described portable terminal can receive data by detecting input of characters or selection of a specific menu displayed on a display unit using the stylus pen. That is, a user can easily input characters into the portable terminal by writing the characters directly on the display unit using the stylus pen. This is, however, possible only with the use of a software application which provides the above function.

In addition, a function for selectively inputting desired data on a keyboard screen displayed on the display unit of the portable terminal must be provided and enabled simultaneously with execution of the application providing the above function, which inconveniences the user when he/she inputs characters in the portable terminals.

What is therefore required is an apparatus and method for inputting characters with the stylus pen even without selecting a mode for using the stylus pen and without the provision of an additional application.

SUMMARY OF THE INVENTION

An object of the present invention is to substantially solve at least the above problems and/or disadvantages and to provide at least the advantages below. Accordingly, an object of the present invention is to provide an apparatus and method for changing an input mode of a portable terminal according to the current state of the portable terminal.

Another object of the present invention is to provide an apparatus and method for changing a current input mode of a portable terminal into an input mode for inputting characters in the portable terminal by directly writing the characters on a display unit of the portable terminal, when detecting a character input into the portable terminal during execution of an application capable of the character input.

A further object of the present invention is to provide an apparatus and method for executing an application capable of a character input when detecting the character input in an idle state of a portable terminal.

According to one aspect of the present invention, a portable terminal capable of changing an input mode includes a touch sensor for detecting an input; and a controller for controlling the touch sensor to receive the input from the touch sensor and changing the input mode if the input is a character input.

According to another aspect of the present invention, a method for setting a connection application executed according to a character input in a portable terminal, includes displaying a list of character input applications; and detecting selection of one of the character input applications to register the selected character input application as the connection application.

According to a further aspect of the present invention, a method for changing an input mode in a portable terminal, includes detecting a character input and determining if the detected character input is a normal input; storing the detected character if the character input is normal; determining the current state of the portable terminal; and executing a connection application corresponding to a first mode if the current state of the portable terminal corresponds to the first mode.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a scheme for changing an input mode according to the current state of a portable terminal when characters are input into the portable terminal using a touch sensor. Examples of a touch sensor are a touch screen and a touch pad.

In the following description, a connection application is defined as one of applications capable of character input, which is intended to be executed when a character input is detected in an idle state of the portable terminal using the touch sensor. Hereinafter, the applications capable of the character input using the touch sensor will be simply referred to as "character input applications".

Figure 1:
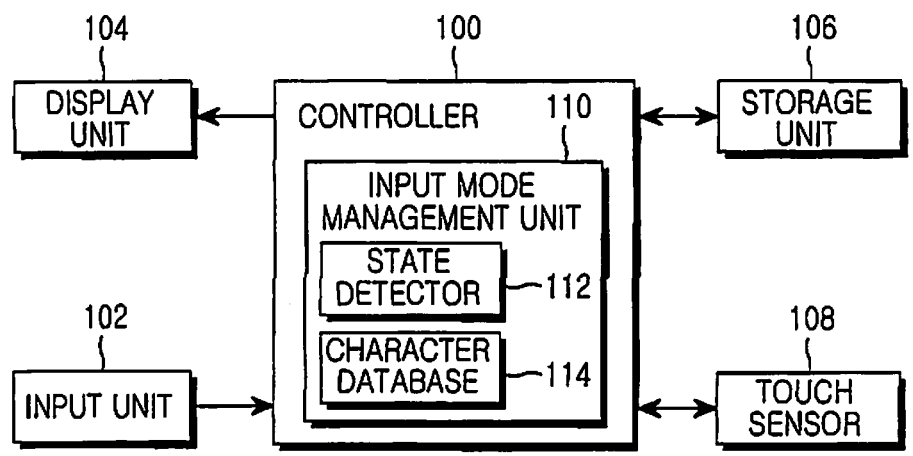
FIG. 1 is a block diagram of a portable terminal capable of changing an input mode according to the present invention.

FIG. 1 is a block diagram of a portable terminal capable of changing an input mode according to the present invention. Examples of the portable terminal are any small-sized portable terminal, including mobile communication terminals, MP3 (MPEG-1 Audio Layer 3) players, Bluetooth® devices, digital cameras, cellular phones, Personal Communication System (PCS) phones, Personal Data Assistants (PDAs), International Mobile Telecommunications-2000 (IMT-2000) terminals, and 4th-Generation (4G) broadband system terminals. The following description will be made with reference to the general structure of the above terminals.

Referring to FIG. 1, the portable terminal includes a controller (e.g., a microprocessor unit (MPU)) 100, an input unit 102, a display unit 104, a storage unit 106, and a touch sensor 108. The controller 100 includes an input mode management unit 110. Alternatively, the input mode management mode 110 may be separate from the controller 100. The input mode management unit 110 includes a state detector 112 and a character database 114.

The controller 100 controls an overall operation of the portable terminal. For example, the controller 100 processes and controls voice communication and data communication. In addition to the general functions, the controller 100 sets a character input application intended to be executed so that characters can be continuously input when a character input is detected in an idle state.

In addition, the controller 100 controls the input mode management unit 110 to change a character input mode according to the current state of the portable terminal.

When the portable terminal detects a character input in an idle state, the controller 100 controls the input mode management unit 110 to execute a character input application using the touch sensor 108. Examples of the character input application using the touch sensor 108 are a memo book and a schedule management book.

When the portable terminal detects a character input during execution of a specific application, the controller 100 controls the input mode management unit 110 to change an input mode of the specific application into a direct input mode for directly inputting characters using an input tool such as a stylus pen.

Under the control of the controller 100, the input mode management unit 110 determines whether the character input using the touch sensor 108 is a normal input. If the character input is a normal input, the input mode management mode 110 orders the state detector 112 to detect whether the portable terminal is executing the specific application. Whether the character input is a normal input may be detected by comparing the character input with character data stored in the character database 114.

Thereafter, the input mode management unit 110 changes the character input mode according to the current state of the portable terminal.

Under the control of the input mode management unit 110, the state detector 112 detects the current state of the portable terminal. That is, the state detector 112 detects whether the portable terminal is executing the character input application.

The character database 114 previously stores character data (e.g., characters such as 가, 나, 다, A, B, and C) for determining whether the character input through the touch sensor 108 is a normal input.

The storage unit 106 includes a program memory, a data memory, and a nonvolatile memory. The program memory stores a program for controlling an overall operation of the portable terminal. A flash memory may be used as the program memory. The data memory temporarily stores data generated during operations of the portable terminal. A Random Access Memory (RAM) may be used as the data memory. The nonvolatile memory stores system parameters and a variety of backup data. According to the present invention, the storage unit 106 stores programs for operations of the controller 100 and the input mode management unit 110.

The input unit 102 has a plurality of buttons included in a keypad of general portable terminals to provide the controller 100 with key input data corresponding to a user input. The display unit 104 displays status information generated during the operation of the portable terminal, numerals and characters, moving pictures and still pictures, and so on. According to the present invention, the display unit 104 displays a character input mode screen (e.g., a specific application mode screen and an idle mode screen).

The touch sensor 108 may provide a plurality of function keys like the keypad and performs a function corresponding to a sensed touch. According to the present invention, the touch sensor 108 senses input of characters by the user and provides the sensed characters to the controller 100.

Hereinbefore, a description has been given of an apparatus for changing an input mode of the portable terminal according to the current state of the portable terminal. Hereinafter, a description will be given of a method for setting an application intended to be executed according to the current state of the portable terminal and a method for changing an input mode of the portable terminal according to the current state of the portable terminal.

Figure 2:
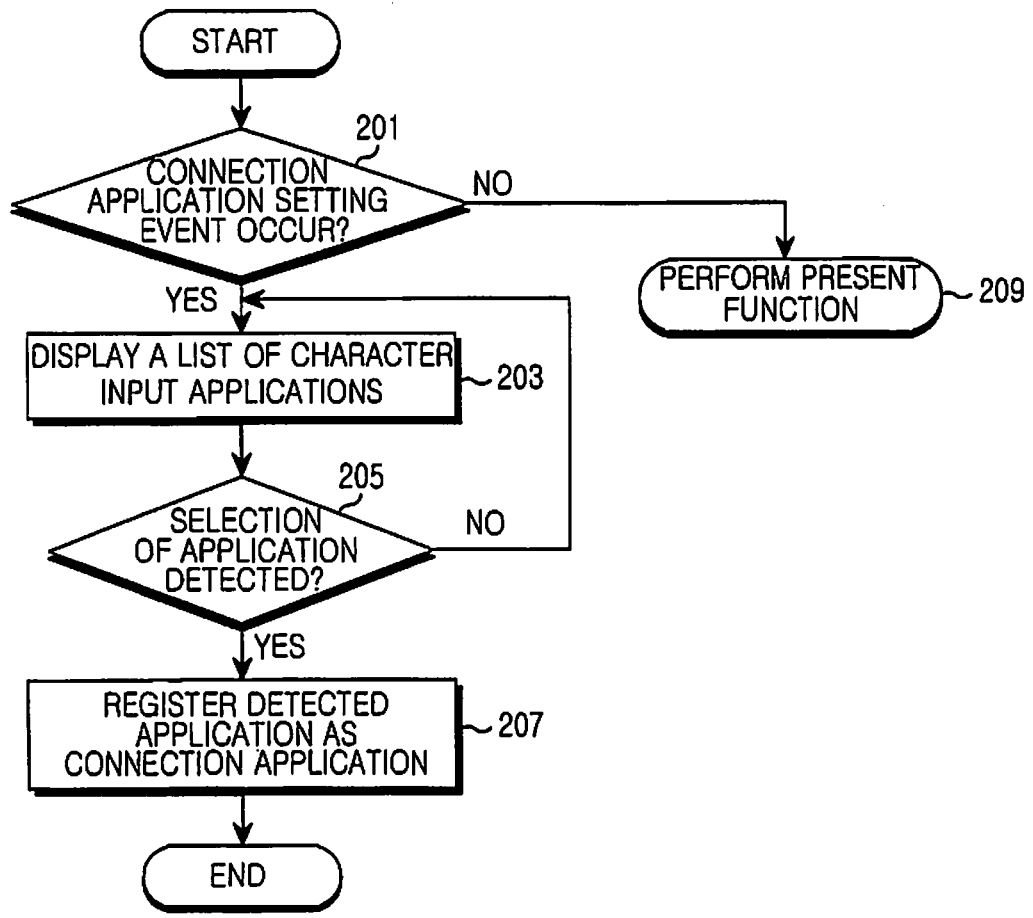
FIG. 2 is a flowchart illustrating a process for setting an application intended to be executed when a character input occurs in an idle state of the portable terminal, according to the present invention.

FIG. 2 is a flowchart illustrating a process for setting an application intended to be executed when a character input occurs in an idle state of the portable terminal, according to the present invention.

Referring to FIG. 2, the controller 100 determines if a connection application setting event occurs in step 201. If so, the process proceeds to step 203; and if not, the process proceeds to step 209 to perform a present function, such as to maintain a standby mode. The connection application setting event refers to an event for setting one of character input applications when a character input is detected in an idle state using the touch sensor 108.

In step 203, the controller 100 displays a list of character input applications (e.g., a memo function, a message function, and a phonebook function) on display unit 104. In step 205, the controller 100 determines if one of the character input applications is selected. If so, the process proceeds to step 207; and if not, the process returns to step 203.

In step 207, the controller 100 registers the selected character input application as the connection application. Thereafter, the controller 100 ends the process.

Figure 3:
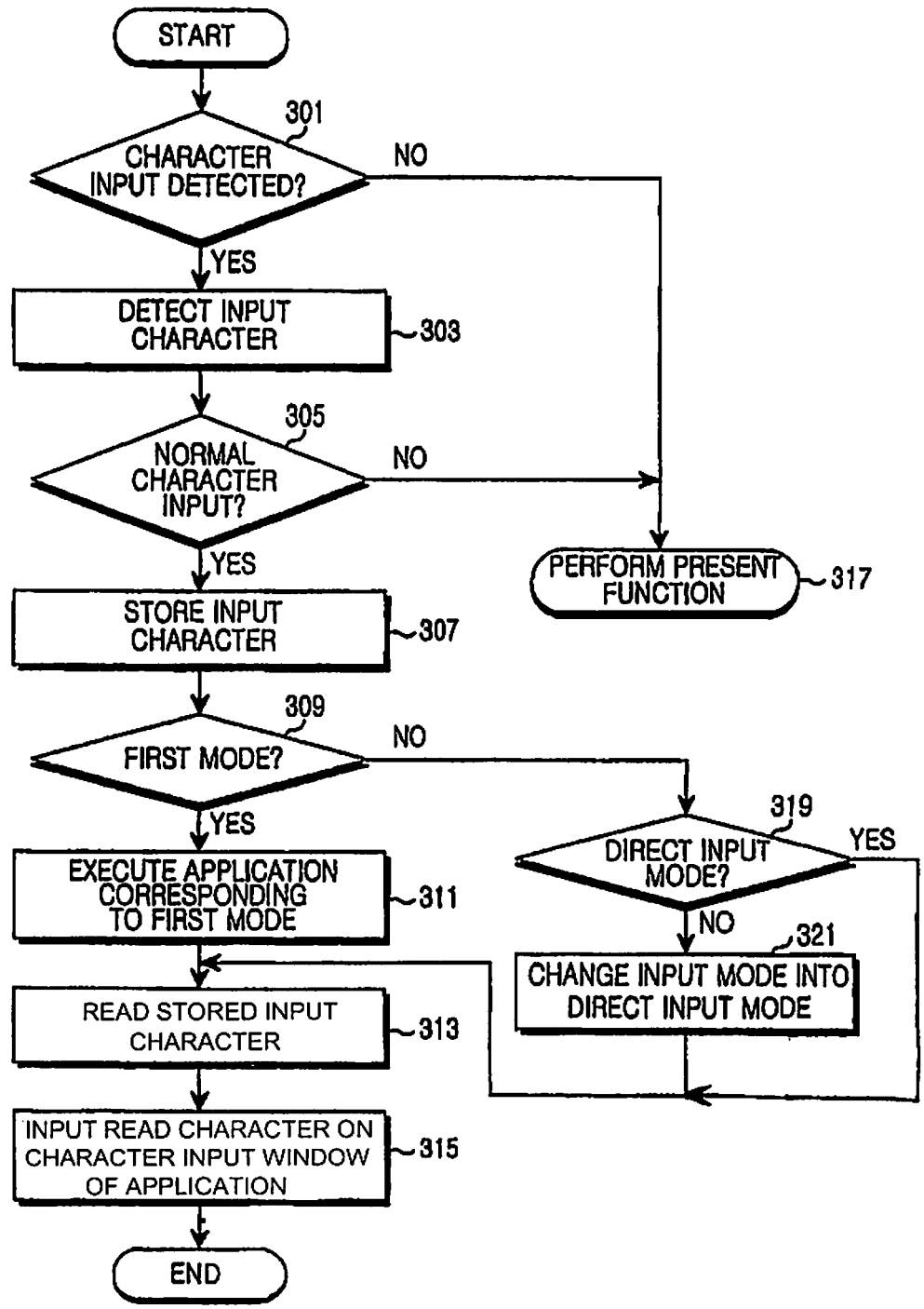
FIG. 3 is a flowchart illustrating a process for changing an input mode according to the current state of the portable terminal for continuous input of characters, according to the present invention.

FIG. 3 is a flowchart illustrating a process for changing an input mode according to the current state of the portable terminal for continuous input of characters, according to the present invention.

Referring to FIG. 3, the controller 100 controls the input mode management unit 110 to detect input of characters using an input tool such as a stylus pen, in step 301. The character input may be detected using input data provided from the touch sensor 108 to the input mode management unit 110. The characters include English alphabets, Korean consonants and vowels, numerals, special characters (e.g., <, *, and #), etc. that can be input using the input unit (keypad) 102 of the portable terminal.

If a character input is detected, the process proceeds to step 303; and if not, the process proceeds to step 317. In step 317, the controller 100 performs a present function (e.g., a standby mode).

In step 303, the controller 100 controls the input mode management unit 110 to detect the input character. In step 305, the controller 100 controls the input mode management unit 110 to determine whether the detected character is a normal input. For example, under the control of the controller 110, the input mode management unit 110 searches the character database 114 and compares the detected character with the previously-stored character data (e.g., 가, 나, 다, A, B, C, and #) in the character database 114 to determine if the detected character matches one of the previously-stored character data. If so, the detected character is determined as being a normal input.

If the detected character is normal, the process proceeds to step 307; and if not, the process proceeds to step 317. In step 317, the controller 100 performs a present function (e.g., character input detection).

In step 307, the controller 100 stores the character detected through the touch sensor 108. In step 309, the controller 100 controls the input mode management unit 110 to detect the current state of the portable terminal.

The current state of the portable terminal can be defined as a first mode or a second mode depending on whether a character input application (e.g., a memo book and a schedule management book) is being executed or not. The first mode corresponds to an idle state of the portable terminal where the character input application is not being executed and the second mode corresponds to the state of the portable terminal where the character input application is being executed.

If the current state of the portable terminal corresponds to the first mode, the process proceeds to step 311; and if the current state corresponds to the second mode, the process proceeds to step 319.

In step 311, the controller 100 controls the input mode management unit 110 to execute an application corresponding to the first mode. The application corresponding to the first mode is the application set in FIG. 2. That is, the controller 100 executes a default application that automatically uses the direct input mode.

In step 319, the controller 100 determines if an input mode of the character input application is a direct input mode.

The input mode includes the direct input mode and an indirect input mode. In the direct input mode, characters can be directly input using the touch sensor 108. In the indirect input mode, characters are input by displaying a keyboard-type key input window on the display unit 104 and receiving desired data from the user through the displayed key input window.

If the input mode of the character input application is the direct input mode, the process proceeds to step 313; and if the input mode is the indirect input mode, the process proceeds to step 321.

In step 321, the controller 100 controls the input mode management unit 110 to change the indirect input mode into the direct input mode. Thereafter, process proceeds to step 313.

Figure 4C:
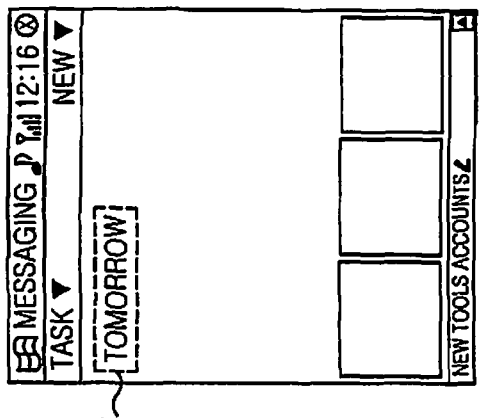
FIGS. 4A through 4C illustrate display screens of the portable terminal changing an input mode according to the present invention.

In step 313, the controller 100 reads the character stored in step 307. In step 315, the controller 100 inputs the read character on the character input window of the application. For example, a read character may be input as illustrated in FIG. 4C. Thereafter, the controller 100 ends the process.

Figure 4A:
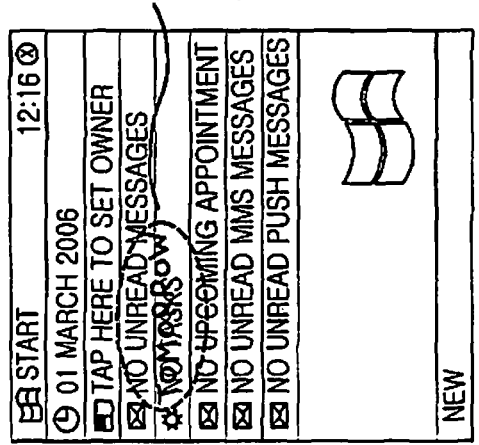
Figure 4B:
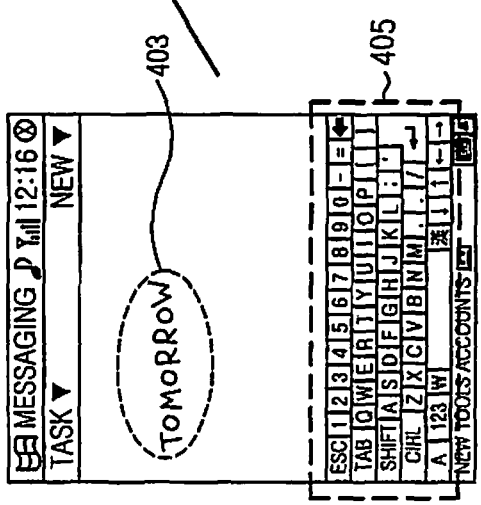

FIGS. 4A through 4C illustrate display screens of the portable terminal changing an input mode according to the present invention.

FIG. 4A illustrates a display screen of the portable terminal when the user inputs characters in the first mode. For example, FIG. 4A illustrates a state 401 where characters such as "tomorrow" are input in an idle state of the portable terminal using an input tool such as a stylus pen.

FIG. 4B illustrates a display screen of the portable terminal when the user inputs characters 403 in the indirect mode of the second mode using a key input window 405 displayed on the display unit 104.

FIG. 4C illustrates a display screen of the portable terminal when the mode of FIG. 4A or 4B is changed into the direct input mode 407. At this point, the screen displays the previously-stored characters on a character input window prior to changing into the direct input mode.

Alternate embodiments of the present invention can also comprise computer readable codes on a computer readable medium. The computer readable medium includes any data storage device that can store data that can be read by a computer system. Examples of a computer readable medium include magnetic storage media (such as Read Only Memory (ROM), floppy disks, hard disks, etc.), optical recording media (such as Compact Disc (CD)-ROMs or Digital Versatile Discs (DVDs)), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As described above, according to the present invention, the application allowing the use of the stylus pen is executed when the character input is detected. Accordingly, characters can be input using the stylus pen even without execution of an additional application.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal capable of changing an input mode, comprising:
   a touch sensor for detecting an input; and
   a controller for receiving the input from the touch sensor, identifying a text based character written in the input, and storing the text based character,
   wherein when an application of receiving character input is not operating in a direct input mode in the portable terminal, the controller switches the application to operate in the direct input mode, reads the stored text based character, and displays the read stored text based character in an input area of the application.

2. The portable terminal of claim 1, wherein the direct input mode recognizes the text based character written in the input and directly inputs the recognized text based character in a predetermined font as if the recognized text based character was entered using a keyboard.

3. The portable terminal of claim 1, wherein the controller comprises a character database for storing character data for identifying the text based character written in the input through the touch sensor.

4. A portable terminal capable of changing an input mode, comprising:
   a touch sensor for detecting an input; and
   a controller for receiving the input from the touch sensor, identifying a text based character written in the input, storing the text based character, and determining whether an application capable of receiving character input is currently running in the portable terminal,
   wherein when the application capable of receiving character input is currently running in the portable terminal, the controller determines whether the application is operating in a direct input mode, switches the application to operate in the direct input mode, when the application is not operating in the direct input mode, reads the stored text based character, and displays the read stored text based character in an input area of the application, and wherein when there is no application capable of receiving character input currently running in the portable terminal, the controller executes a default application capable of receiving character input, in the direct input mode, reads the stored text based character, and displays the read stored text based character in an input area of the default application.

5. The portable terminal of claim 4, wherein the direct input mode recognizes the text based character written in the input and directly inputs the recognized text based character in a predetermined font as if the recognized text based character was entered using a keyboard.

6. The portable terminal of claim 4, wherein the controller comprises a character database for storing character data for identifying the text based character written in the input through the touch sensor.

7. The portable terminal of claim 4, wherein the controller receives a set default application command, displays a list of applications capable of receiving character input, receives a selection of one of the displayed applications capable of receiving character input, and sets the one of the displayed applications as the default application.

8. A method for changing an input mode in a portable terminal, the method comprising the steps of:
   detecting an input through a touch screen of the portable terminal;
   identifying a text based character written in the input;
   storing the text based character;
   determining whether an application capable of receiving character input is currently running in the portable terminal;
   when the application capable of receiving character input is currently running in the portable terminal, determining whether the application is operating in a direct input mode, switching the application to operate in the direct input mode, when the application is not operating in the direct input mode, reading the stored text based character, and displaying the read stored text based character in an input area of the application; and
   when there is no application capable of receiving character input currently running in the portable terminal, executing a default application capable of receiving character input, in the direct input mode, reading the stored text based character, and displaying the read stored text based character in an input area of the default application.

9. The method of claim 8, wherein the direct input mode recognizes the text based character written in the input and directly inputs the recognized text based character in a predetermined font as if the recognized text based character was entered using a keyboard.

10. The method of claim 8, wherein identifying the text based character written in the input comprises:
    comparing the input with character data included a character database; and
    matching the text based character written in the input to a known text based character among the character data included the character database.

11. The method of claim 8, further comprising:
    receiving, by the portable terminal, a command for setting the default application;
    displaying a list of applications capable of receiving character input;
    receiving a selection of one of the displayed applications capable of receiving character input; and
    setting the one of the displayed applications as the default application.

12. A non-transitory computer-readable recording medium having recorded thereon a program changing an input mode in a portable terminal, comprising:
    a first segment for detecting an input through a touch screen of the portable terminal;
    a second segment for identifying a text based character written in the input;
    a third segment for storing the text based character;
    a fourth segment for determining whether an application capable of receiving character input is currently running in the portable terminal;
    a fifth segment for, when the application capable of receiving character input is currently running in the portable terminal, determining whether the application is operating in a direct input mode, switching the application to operate in the direct input mode, when the application is not operating in the direct input mode, reading the stored text based character, and displaying the read stored text based character in an input area of the application; and
    a sixth segment for, when there is no application capable of receiving character input currently running in the portable terminal, executing a default application capable of receiving character input, in the direct input mode, reading the stored text based character, and displaying the read stored text based character in an input area of the default application.

* * * * *